United States Patent

[11] 3,532,199

[72] Inventor Johann Kraus
  Kissing near Augsburg, Germany
[21] Appl. No. 770,495
[22] Filed Oct. 25, 1968
[45] Patented Oct. 6, 1970
[73] Assignee Keller & Knappich G.m.b.H.
  Augsburg, Germany
  a corporation of Germany
[32] Priority Nov. 21, 1967
[33] Germany
[31] No. 1,625,753

[54] TORQUE OVERLOAD SAFETY DEVICE FOR CLUTCHES
6 Claims, 1 Drawing Fig.
[52] U.S. Cl. .................................................. 192/56,
  192/85, 200/47, 61.46
[51] Int. Cl. ..................................................... F16d 43/20

[50] Field of Search ........................................... 192/56,
  56(F), 150, 85(A); 64/11, 28—30, 30(CD); 200/47,
  61.46

[56] References Cited
UNITED STATES PATENTS
2,277,554  3/1942  McCoy ......................... 192/56(F)
2,363,611 11/1944  Newell ......................... 200/61.46
3,263,451  8/1966  Reimer ........................ 192/56X Primary Examiner—Allan D. Herrmann
Attorney—Lowry, Rinehart and Marvka ABSTRACT: A torque overload safety device for operating clutch-disengaging means wherein a resilient intermediate member in the drive train allows limited relative rotation which rotation, responsive to the load on the drive train, causes a sleeve to move in an axial direction to operate the clutch-disengaging means in the event there is an overload on the drive train.

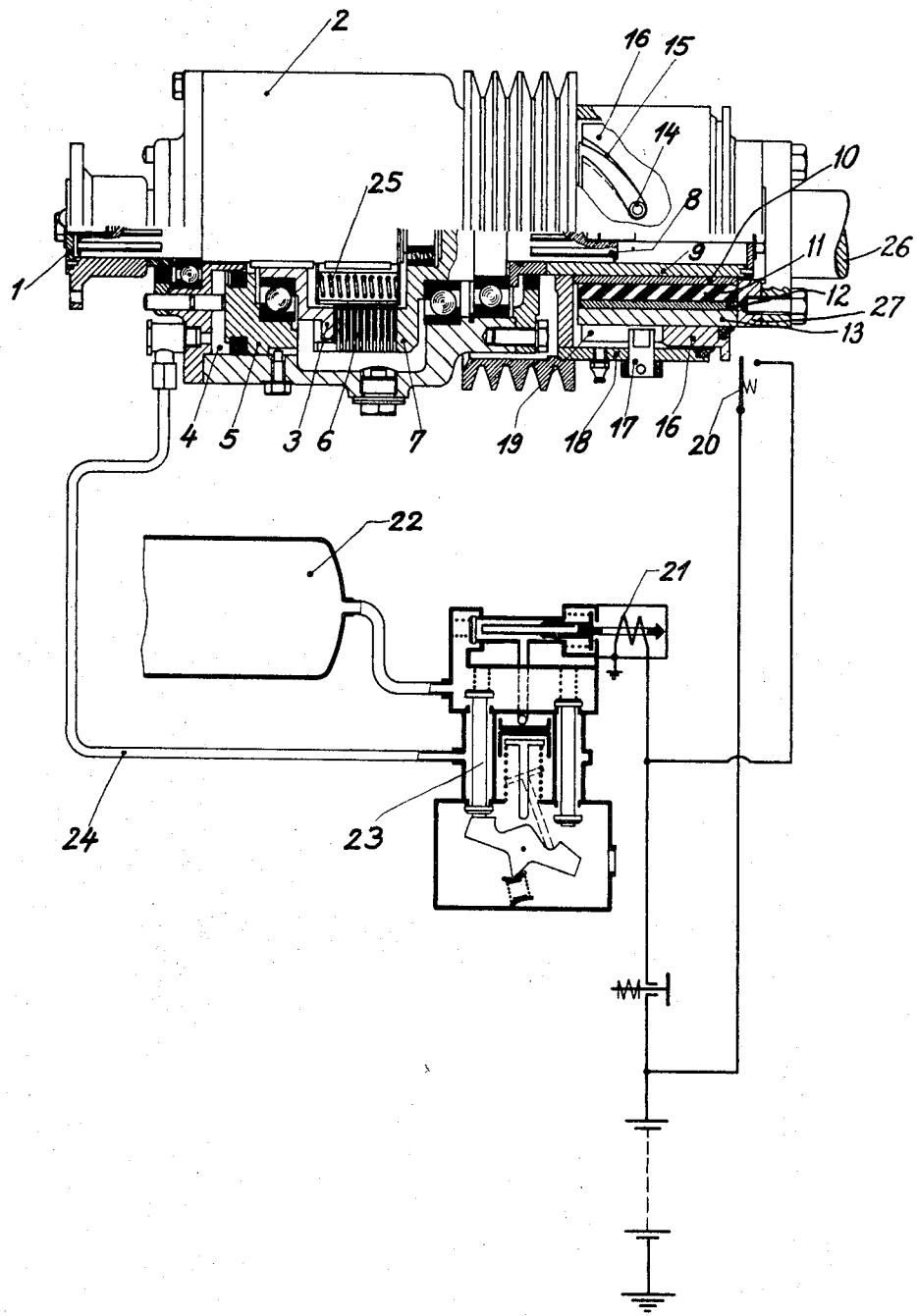

TORQUE OVERLOAD SAFETY DEVICE FOR CLUTCHES

The present invention concerns a torque overload safety device for clutches having a resilient intermediate member which allows relative rotary movement between a driving shaft and a driven shaft, the said relative rotary movement being employed to disengage the clutch on the occurrence of an overload. In a known embodiment of this kind helical springs are used as the resilient intermediate member. These are not suitable for dealing with an instantaneous or shock load, since the overload safeguard is tripped when load vibrations exceed the overload limit. This renders this type of overload safeguard unsuitable for practical use, because such vibrational loads do not constitute a true overload; hence the safeguard is tripped without there being any necessity therefor.

Further disadvantages of the known embodiment are the necessity of an intermediate disc provided with mountings between the driving and driven shaft for the helical springs and the need to provide the driving shafts with toothed couplings driving gear wheels each on a shaft, a shaft sleeve of the gear wheel engaged by the driven shaft driving the balls running in tracks on a slotted member so that they are displaced axially by an amount proportioned to the torque between the two gear shafts. The said displacement actuates a safety overload device. This construction is costly and requires considerable space.

It is an object of the present invention to avoid the disadvantages of this known embodiment and to provide a torque overload safety device which is insensitive to short torque variations and is tripped only by a true overload, and which is both compact and inexpensive while maintaining one advantage of the known embodiment, that the adjusting member is located outside the device so as to be easily adjustable.

According to the present invention, a torque overload safety device for a clutch has a resilient intermediate member allowing relative rotation between a driving shaft and a driven shaft, the said relative rotation being adapted to operate means to disengage the clutch. The intermediate member consists of a compound sleeve coupling, the internal sleeve of which is connected to the one shaft and the outer sleeve is connected to the other shaft, there being a rubber layer between the two sleeves which is secured to both sleeves.

Reference should now be made to the accompanying drawing.

A torque applied to a driving shaft stub 1 of a plate clutch 2 is transmitted to a clutch half 3. When compressed air is supplied to an annular cylinder 4 a ring piston 5 applies pressure to the clutch plates 6 and causes the torque to be transmitted to a driven half 7 of the clutch. A shaft stub 8 is connected to the clutch half 7, on which there is a sleeve 9 acting as driving means for a resilient overload safeguard. This is a compound coupling, which is mounted with a drive fit on drive sleeve 9. Internal sleeve 10 is fixed to drive sleeve 9 and rubber layer 11 which is enclosed by and secured to an outer sleeve 12. Sleeve 13 is a drive fit on sleeve 12, and constitutes the coupling. Driven shaft 26 is coupled through ring 27 to sleeve 13 whereby the coupling drives the driven shaft. From the outer surface of sleeve 13 projects a coupling pin 14 which runs in a helical slot 15 in an internal sleeve 16. This internal sleeve 16 is loose on sleeve 13 and is coupled by means of a pin 17 to a cap 18 mounted with a drive fit on the driving shaft 9 and consequently rotating with it. The pin 17 engages in an axially parallel groove 19 in internal sleeve 16. Thus, the sleeve 16 rotates with the shaft 9, but is axially displaceable with respect to it.

The torque applied to the driven sleeve 13 by means of the compound coupling 10, 11, 12 is equal to the load torque. If the load torque, however, exceeds a predetermined value, then the resultant travel of the coupling pin 14 in the helical slot 15, due to the compliance of the rubber layer 11, causes such an axial displacement of the sleeve 16 that its outer rim actuates an electric switch 20, which is adjustable relative to the sleeve 16; this switch closes the circuit of a solenoid 21, which actuates the associated valve and allows the compressed air in the cylinder 4; previously applied thereto via pipe 24 from a tank 22, to discharge via a valve system 23 and pipe 24, this allowing the clutch plates 6 to be separated by the springs 25.

The maximum torque transmitted by the clutch is set by the distance between the end rim of the internal sleeve 16 and the switch 20, and this distance and hence the maximum torque is adjustable.

I claim:

1. A torque overload safety device for operating clutch disengaging means comprising a resilient intermediate member for transmission of power between a driving and a driven shaft and allowing limited relative rotation between said shafts, a member adjacent said shafts and movable along a path parallel to the axes of said shafts, said member defining a helical and a straight axial groove, means coupling one of said shafts with said helical groove in said member and means coupling said other shaft with said axial groove in said member whereby said limited relative rotation between shafts causes said member to move axially.

2. A torque overload safety device as recited in claim 1 wherein said member is a sleeve arranged coaxially, with respect to said shafts.

3. A torque overload safety device for operating clutch disengaging means comprising a resilient intermediate member allowing relative rotation between a driving and a driven shaft, said intermediate member comprising an inner sleeve connected to one of said shafts, an outer sleeve connected to the other of said shafts, a resilient material between said sleeves; an axially displaceable member comprising a further sleeve defining a helical and a straight axial groove and arranged coaxially with respect to said shafts; a first pin coupling said further sleeve via said helical groove with one of said shafts; and a second pin coupling said further sleeve via said axial groove with said other shaft.

4. A torque overload safety device as recited in claim 3, wherein said clutch disengaging means comprises a pressure air supply, a valve controlling said supply to said clutch, a switch operated by said displaceable member upon overload of said clutch, a solenoid energized by said switch and a coupling between said solenoid and said valve whereby upon overload of said clutch said valve regulates said pressure air supply to disengage said clutch.

5. A torque overload safety device as recited in claim 3 wherein said clutch disengaging means comprises means responsive to axial movement of said displaceable member upon overload of said clutch for disengaging said clutch.

6. A torque overload safety device as recited in claim 5 wherein said clutch disengaging means comprises means for operating said clutch and means responsive to axial movement of said displaceable member upon overload of said clutch for controlling said means for operating said clutch.